(12) United States Patent
Oh et al.

(10) Patent No.: US 11,955,690 B2
(45) Date of Patent: Apr. 9, 2024

(54) RADAR LEVEL GAUGING APPARATUS

(71) Applicant: SMART RADAR SYSTEM, INC., Seongnam-si (KR)

(72) Inventors: Kyung Sub Oh, Hwaseong-si (KR); Yong Jae Kim, Yongin-si (KR)

(73) Assignee: SMART RADAR SYSTEM, INC., Seongnam-si (KR)

( * ) Notice: Subject to any disclaimer, the term of this patent is extended or adjusted under 35 U.S.C. 154(b) by 99 days.

(21) Appl. No.: 17/326,275

(22) Filed: May 20, 2021

(65) Prior Publication Data

US 2022/0158324 A1    May 19, 2022

(30) Foreign Application Priority Data

Nov. 16, 2020  (KR) .................. 10-2020-0152610
Feb. 22, 2021  (KR) .................. 10-2021-0023442

(51) Int. Cl.
*H01Q 1/22*    (2006.01)
*G01F 23/284*  (2006.01)
*G01S 13/88*   (2006.01)
*G01S 7/02*    (2006.01)

(52) U.S. Cl.
CPC ........... *H01Q 1/225* (2013.01); *G01F 23/284* (2013.01); *G01S 13/88* (2013.01); *G01S 7/028* (2021.05)

(58) Field of Classification Search
CPC .................................................. H01Q 15/02
See application file for complete search history.

(56) References Cited

U.S. PATENT DOCUMENTS

| 3,020,542 A | * | 2/1962 | Johnston, Jr. | ........... G01S 13/42 |
| | | | | 342/11 |
| 4,566,321 A | * | 1/1986 | Zacchio | ................ G01F 23/284 |
| | | | | 343/753 |
| 5,680,048 A | | 10/1997 | Wollny | |

(Continued)

FOREIGN PATENT DOCUMENTS

| EP | 1014492 A2 | 6/2000 |
| EP | 1014492 A3 | 7/2000 |

(Continued)

OTHER PUBLICATIONS

L. Peters, R. C. Rudduck and L. Du, "RFI Reduction by Control of Antenna Sidelobes," in IEEE Transactions on Electromagnetic Compatibility, vol. 6, No. 1, pp. 1-11, Jan. 1964, doi: 10.1109/TEMC.1964.4307323. (Year: 1964).*

(Continued)

*Primary Examiner* — Bernarr E Gregory
(74) *Attorney, Agent, or Firm* — Insight Law Group, PLLC; Seung Lee

(57) ABSTRACT

A radio detection and ranging (RADAR) level gauging apparatus measures a level of liquid in a storage tank. The apparatus includes an antenna that emits a RADAR signal and receives the signal reflected from the level interface. The antenna has a lens and an absorber to reduce side lobes of the signal. The apparatus further includes a controller which performs transmission control, reception control, and level measurement control using the received RADAR signal. The distance from the emission position of the RADAR signal to the level interface is measured, and thus a level can be determined.

7 Claims, 4 Drawing Sheets

(56) References Cited

U.S. PATENT DOCUMENTS

| | | | | |
|---|---|---|---|---|
| 5,689,265 | A * | 11/1997 | Otto | G01F 23/284 340/617 |
| 6,262,688 | B1 * | 7/2001 | Kasahara | H01Q 15/08 343/765 |
| 6,266,029 | B1 * | 7/2001 | Lee | H01Q 15/08 343/757 |
| 6,329,956 | B1 * | 12/2001 | Tateishi | H01Q 3/08 343/753 |
| 8,018,374 | B2 * | 9/2011 | Imai | G01S 7/03 342/134 |
| 8,471,757 | B2 * | 6/2013 | Yonemoto | H01Q 15/08 343/912 |
| 2003/0179148 | A1 * | 9/2003 | Ohlsson | G01F 23/284 343/786 |
| 2006/0158371 | A1 * | 7/2006 | Duivenvoorden | G01F 23/284 73/290 R |
| 2008/0238810 | A1 * | 10/2008 | Winsor | H01Q 15/02 343/909 |
| 2014/0266864 | A1 | 9/2014 | Fredriksson | |
| 2015/0160066 | A1 * | 6/2015 | Sai | G01S 7/285 342/21 |
| 2015/0160067 | A1 * | 6/2015 | Sai | G01S 7/285 342/21 |
| 2019/0331518 | A1 | 10/2019 | Ohlsson | |
| 2019/0353514 | A1 * | 11/2019 | Kienzle | G01S 13/88 |
| 2021/0278518 | A1 | 9/2021 | Xin et al. | |

FOREIGN PATENT DOCUMENTS

| | | | |
|---|---|---|---|
| EP | 1089377 A2 | 4/2001 | |
| EP | 1089377 A3 | 10/2003 | |
| EP | 2112482 A1 | 10/2009 | |
| EP | 3691026 A1 | 8/2020 | |
| JP | 2013-032999 B2 | 2/2013 | |
| KR | 10-2015-0130294 A1 | 11/2015 | |
| KR | 10-2016-0102426 A | 8/2016 | |
| KR | 10-2018-0117854 A | 10/2018 | |
| KR | 10-2019-0035895 A | 4/2019 | |
| WO | WO88/09066 A1 * | 11/1988 | ........... H01Q 25/008 |

OTHER PUBLICATIONS

P. D. Kuroptev, V. V. Levyakov and A. V. Fateev, "Modified 0.6-50 GHz ultra-wideband double-ridged horn antenna design for parameters improvement," 2017 47th European Microwave Conference (EuMC), Nuremberg, Germany, 2017, pp. 1313-1316, doi:10.23919/EuMC.2017.8231093. (Year: 2017).*

European Search Report dated Oct. 25, 2021 from the European Patent Office for European Application No. 2117409.0.

Carolina Mateo-Segura et al., Flat Luneburg Lens via Transformation Optics for Directive Antenna Applications, IEEE Transactions on Antennas and Propagation, vol. 62, No. 4, Apr. 2014.

C. Dahl et al., Conceptual Design of a Dielectric Hemispherical Lens Antenna with a Congruent Radiation Pattern for Beam Steering Applications, 2013 Antennas and Propagation Society International Symposium (APSURSI), IEEE, Jul. 7, 2013, pp. 1296-1297, XP032556771.

Non-final office action dated Mar. 10, 2022 for Korean Application No. 10-2021-0023442.

Notice of Allowance dated Sep. 28, 2022 for Korean Application No. 10-2021-0023442.

* cited by examiner

RADAR LEVEL GAUGING APPARATUS

CROSS-REFERENCE TO RELATED APPLICATION(S)

This application claims priority from Korean Patent Application No. 10-2020-0152610, filed on Nov. 16, 2020 and No. 10-2021-0023442, filed on Feb. 22, 2021, in the Korean Intellectual Property Office, the disclosure of which is incorporated herein by reference in its entirety.

BACKGROUND

1. Field

The following description relates to a level measurement technology, and more particularly, to a radio detection and ranging (RADAR) level gauging apparatus.

2. Description of Related Art

In a level measurement technology using a radio detecting and ranging (RADAR) signal, a RADAR level gauging apparatus, which is installed above a tank for storing liquid and the like, emits a RADAR signal in a direction perpendicular to a level interface in the tank and receives the RADAR signal reflected from the level interface, thereby measuring a level.

Since an emission time, a reception time, and a speed of the RADAR signal are values to be measured, a distance from an emission position of the RADAR signal to the level interface can be measured, and thus a level can be determined.

Korean Patent Laid-Open Application No. 10-2015-0130294 (Nov. 23, 2015) proposes a RADAR level gauge in which a transceiver network, a processing network, and signal and power interfaces are enclosed in a housing, and a transceiver circuit is electrically connected to a signal propagation device extending into the tank.

In order to reduce interference with other devices using the same frequency, a radar level gauging apparatus should reduce a side lobe as much as possible at a signal emission angle of ±60° or more. In the conventional radar level gauging apparatus, a method of reducing a side lobe includes a method of increasing a length of a horn, a method of using a corrugated horn, and a method of using a dielectric loaded horn.

The method of increasing a length of a horn has a disadvantage of increasing a size of the radar level gauging apparatus. The method of using a corrugated horn should corrugate a side surface of a corrugated horn and thus has a disadvantage in that machining precision should be increased in the case of a high frequency which requires a reduced depth and width of a corrugated portion due to a short wavelength.

Meanwhile, the method of using a dielectric loaded horn has a disadvantage in that a shape of a dielectric should be precisely made as a frequency is increased and, since a length of the dielectric through which radio waves pass is long, loss of the dielectric is great.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to a radio detection and ranging (RADAR) level gauging apparatus which allows a side lobe, which is a factor that degrades level measurement precision and interferes with other devices, to be reduced and of which a size is allowed to be miniaturized.

In one general aspect, a RADAR level gauging apparatus includes an antenna configured to emit a RADAR signal to a level interface and receive the RADAR signal reflected from the level interface, and a controller configured to perform transmission control for the RADAR signal emitted by the antenna, reception control for the RADAR signal received by the antenna, and level measurement control using the received RADAR signal, wherein the antenna includes a lens through which the RADAR signal is transmitted or received in a direction perpendicular to the level interface, and an absorber configured to reduce a side lobe of the RADAR signal transmitted or received through the lens.

According to an additional aspect of the present invention, the lens may be a Luneburg lens of which a total length is minimizable because a distance between a focal point and a lens is short and through which the RADAR signal, which is transmitted and received in a wide direction, is focusable in the direction perpendicular to the level interface.

According to an additional aspect of the present invention, in order to satisfy Federal Communications Commission (FCC) regulations, the antenna may be implemented to emit a RADAR signal having a beam width of 3 dB at an emission angle of less than 8°.

According to an additional aspect of the present invention, in order to satisfy the FCC regulations, the antenna may be implemented to emit a RADAR signal having a side lobe level of less than −38 dB at an emission angle of ±60° or more.

According to an additional aspect of the present invention, the antenna may further include a cylinder antenna of which an inside is protected by being wrapped around an outside thereof and which simultaneously serve as a waveguide and serve to reduce a side lobe which is an interference component with other devices.

According to an additional aspect of the present invention, the antenna may further include a waveguide configured to guide the RADAR signal between the controller and the Luneburg lens, at least two lateral fixing rods configured to laterally fix the Luneburg lens, and an upper support configured to support the Luneburg lens in a direction from top to bottom.

According to an additional aspect of the present invention, the controller may include a RADAR signal generator configured to generate the RADAR signal for measuring a level; a trigger signal generator configured to generate a periodic trigger signal for whether to transmit or receive the RADAR signal; a RADAR signal transmission/reception processor configured to process and transmit, in response to the trigger signal generated by the trigger signal generator, the RADAR signal generated by the RADAR signal generator to periodically emit the RADAR signal to the level interface through the antenna or configured to receive and process the RADAR signal reflected from the level interface and periodically received through the antenna; and a level measurement part configured to periodically measure the level using the RADAR signal which is periodically received and processed by the RADAR signal transmission/reception processor and reflected from the level interface.

Other features and aspects will be apparent from the following detailed description, the drawings, and the claims.

Figure 1:
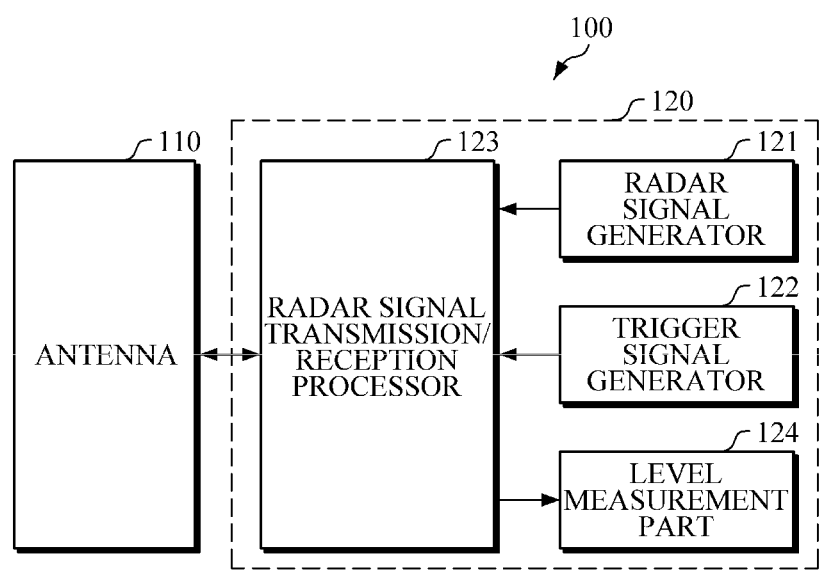
FIG. 1 is a block diagram illustrating a configuration of one embodiment of a radio detection and ranging (RADAR) level gauging apparatus according to the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art.

Also, descriptions of well-known functions and constructions may be omitted for increased clarity and conciseness.

When a component is referred to as being "connected" or "coupled" to another component, it may be directly connected or coupled to another component, but it should be understood that still another component may be present between the component and another component.

In contrast, when a component is referred to as being "directly connected" or "directly coupled" to another component, it should be understood that still another component may not be present between the component and another component.

FIG. 1 is a block diagram illustrating a configuration of one embodiment of a radio detection and ranging (RADAR) level gauging apparatus according to the present invention. As shown in FIG. 1, a RADAR level gauging apparatus 100 according to the present embodiment includes an antenna 110 and a controller 120.

The antenna 110 emits a RADAR signal to a level interface and receives the RADAR signal reflected from the level interface. For example, in order to satisfy Federal Communications Commission (FCC) regulations, the antenna 110 may be implemented to emit a RADAR signal having a beam width of 3 dB at an emission angle of less than 8°.

Alternatively, in order to satisfy the FCC regulations, the antenna 110 may be implemented to emit a RADAR signal having a side lobe level of less than −38 dB at an emission angle of ±60° or more.

Figure 2:
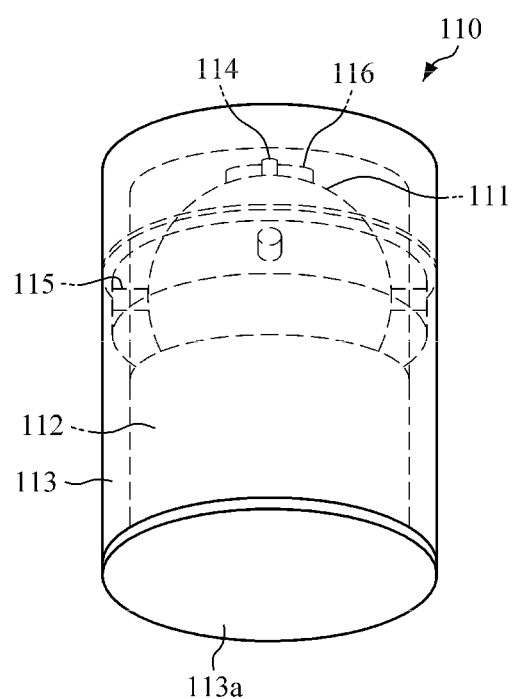
FIG. 2 is a perspective projection illustrating a configuration of one embodiment of an antenna of the RADAR level gauging apparatus according to the present invention.
Figure 3:
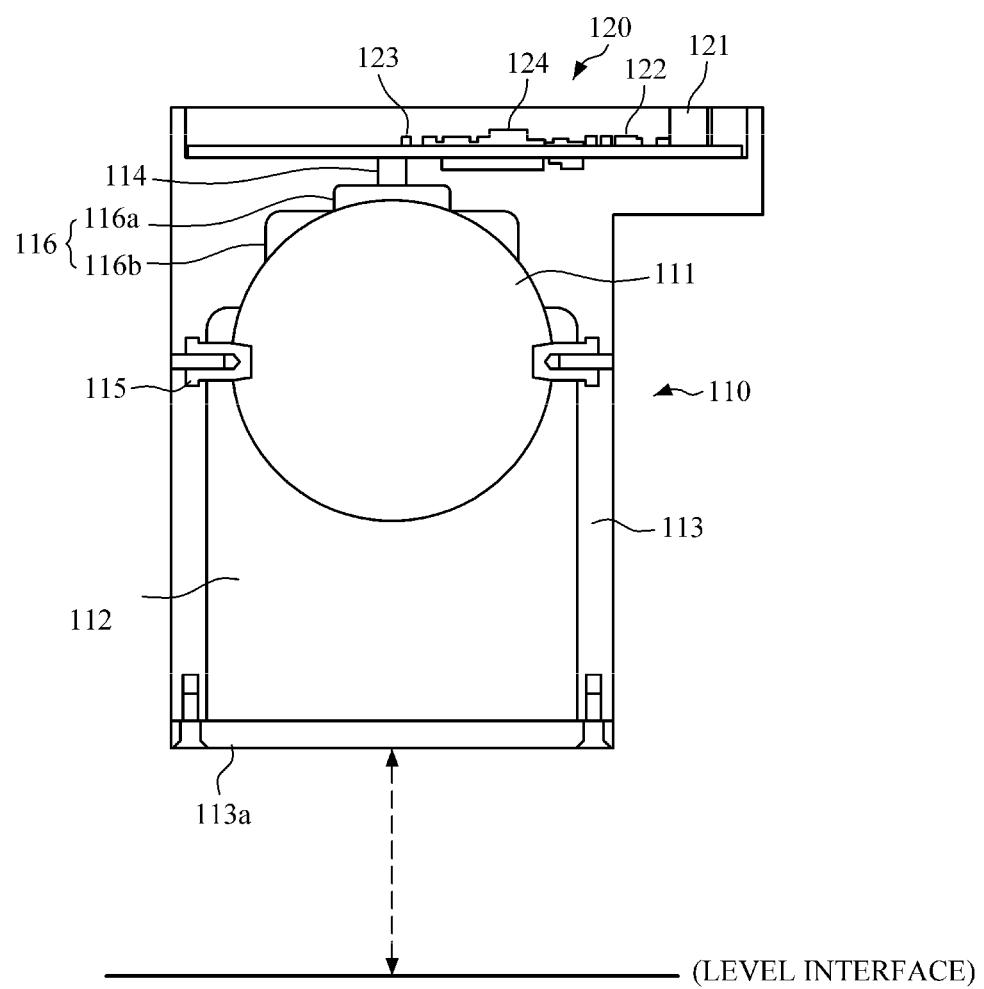
FIG. 3 is a cross-sectional view illustrating the configuration of one embodiment of the antenna of the RADAR level gauging apparatus according to the present invention.

FIG. 2 is a perspective projection illustrating a configuration of one embodiment of an antenna of the RADAR level gauging apparatus according to the present invention, and FIG. 3 is a cross-sectional view illustrating the configuration of one embodiment of the antenna of the RADAR level gauging apparatus according to the present invention.

As shown in FIGS. 2 and 3, in order to improve a level measurement performance by reducing a side lobe which is a noise component, the antenna 110 may include a lens 111 and an absorber 112.

A RADAR signal is transmitted and received in a direction perpendicular to the level interface through the lens 111. For example, the lens 111 may be a Luneburg lens of which a total length may be minimized because a distance between a focal point and a lens is short and through which RADAR signals, which are transmitted and received in a wide direction, may be focused in a direction perpendicular to a level interface.

When the Luneburg lens is used as the lens 111, a propagation path of the RADAR signal may be reduced and the RADAR signal may be concentrated in the direction perpendicular to the level interface so that a size of the RADAR level gauging apparatus may be miniaturized and a level measurement performance may be improved.

The absorber 112 reduces a side lobe of the RADAR signal transmitted and received through the lens 111. In this case, the absorber 112 may be disposed on a front surface of the lens 111 in the direction perpendicular to the level interface.

For example, the absorber 112 may be made of an electromagnetic wave absorbing dielectric material containing a carbon-based or nitrile-based material and may remove a current flowing along a surface of the absorber 112 to be implemented to reduce a side lobe which is an interference component with other devices.

A current flows only along a surface of a dielectric and does not flow in the dielectric which acts as a non-conductor. Thus, the absorber 112 is made of the electromagnetic wave absorbing dielectric material to reduce a current flowing along the surface of the absorber 112 so that the side lobe, which is an interference component with other devices, may be reduced.

Due to the absorber 112, a RADAR signal having a beam width of 3 dB at an emission angle of less than 8° and a side lobe level of less than −38 dB at an emission angle of ±60° or more may be emitted so that the FCC regulations may be satisfied.

Figure 4:
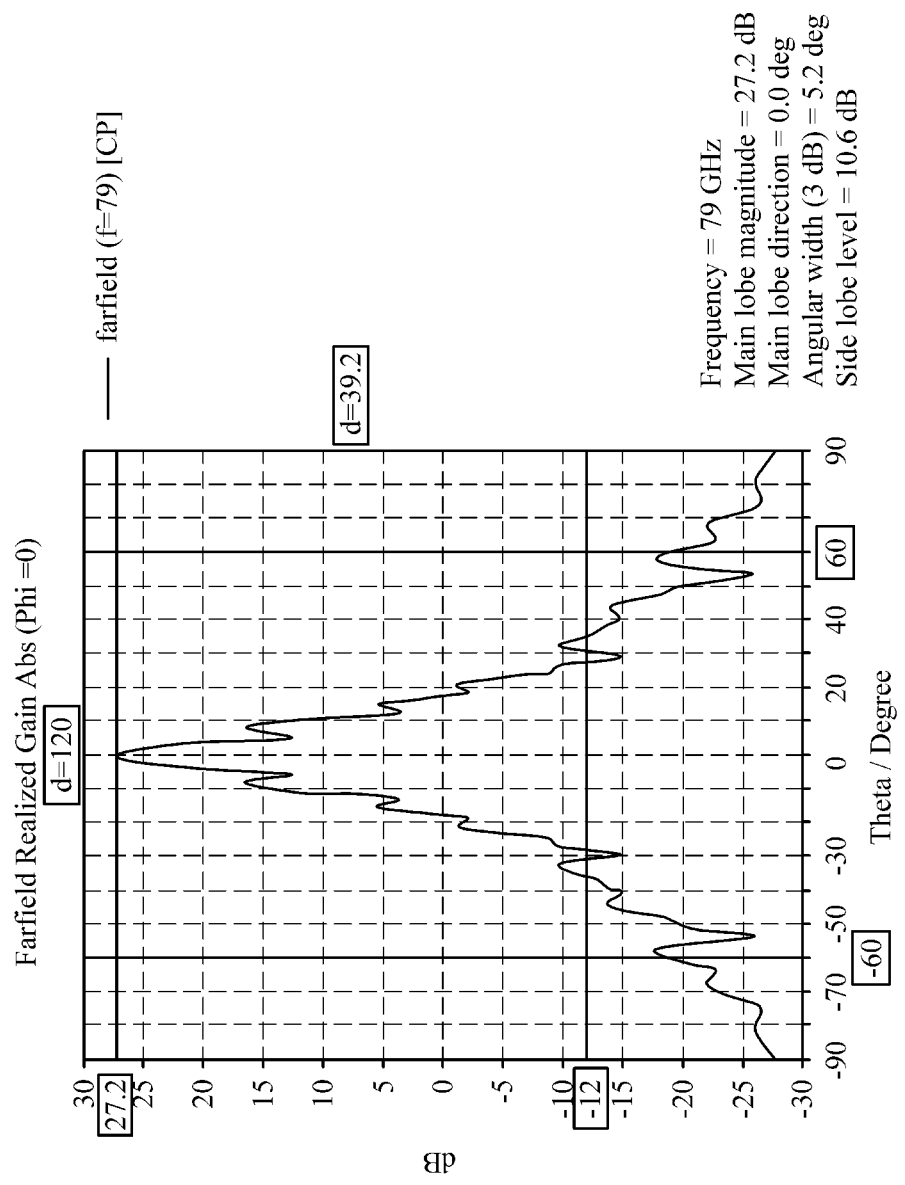
FIG. 4 is a diagram illustrating a main lobe and a side lobe according to an emission angle of a RADAR signal emitted by the RADAR level gauging apparatus according to the present invention.

FIG. 4 is a diagram illustrating a main lobe and a side lobe according to an emission angle of a RADAR signal emitted by the RADAR level gauging apparatus according to the present invention. Referring to FIG. 4, it can be seen that a RADAR signal including a main lobe having a beam width of 3 dB at an emission angle of less than 8° and a side lobe having a beam width of less than −38 dB at an emission angle of ±60° or more is emitted.

The controller 120 performs control, which includes transmission control for RADAR signals emitted by the antenna 110, reception control for the RADAR signals received by the antenna 110, and level measurement control using the received RADAR signals, on an overall operation of the RADAR level gauging apparatus.

For example, the controller 120 may include a RADAR signal generator 121, a trigger signal generator 122, a RADAR signal transmission/reception processor 123, and a level measurement part 124, which may be modularized on a printed circuit board (PCB) mounted in a PCB mounting groove formed in an apex portion of the antenna 110.

The RADAR signal generator 121 generates a RADAR signal for level measurement. For example, the RADAR signal generator 121 may be implemented to generate a pulse signal having a frequency ranging from 75 GHz to 85

GHz or a frequency modulated continuous wave (FMCW) signal, but the present invention is not limited thereto.

The trigger signal generator 122 generates a periodic trigger signal for whether to transmit or receive a RADAR signal. The trigger signal generated by the trigger signal generator 122 is periodically transmitted to the RADAR signal transmission/reception processor 123.

In response to the trigger signal generated by the trigger signal generator 122, the RADAR signal transmission/reception processor 123 processes and transmits the RADAR signal generated by the RADAR signal generator 121 to periodically emit the RADAR signal to the level interface through the antenna 110 or receives and processes the RADAR signal reflected from the level interface and periodically received through the antenna 110.

The level measurement part 124 periodically measures a level using the RADAR signal which is periodically received and processed by the RADAR signal transmission/reception processor 123 and is reflected from the level interface. An algorithm for measuring a level using the RADAR signal reflected from the level interface is an algorithm which is already known prior to the present application, and thus a detailed description thereof will be omitted herein.

Since an emission time, a reception time, and a speed of the RADAR signal are values to be measured, a distance from an emission position of the RADAR signal to the level interface may be measured through the level measurement part 124, and thus the level may be measured.

Since the present invention is implemented as described above, it is possible to reduce a side lobe which is a factor that degrades level measurement precision and interferes with other devices. The level measurement precision may be improved and the RADAR level gauging apparatus may be miniaturized so that convenience of a user may be improved.

Meanwhile, according to an additional aspect of the present invention, the antenna 110 may further include a cylinder antenna 113. The inside of the cylinder antenna 113 is protected by being wrapped around the outside thereof, and the cylinder antenna 113 simultaneously serves as a waveguide and serves to reduce a side lobe which is an interference component with other devices.

Due to the cylinder antenna 113, a side lobe is partially suppressed at an emission angle of ±60° or more. For example, the cylinder antenna 113 may be made of a metal material such as aluminum (Al) or a stainless steel (SUS), and a cover 113a is coupled to an end portion of the cylinder antenna 113.

Since the cylinder antenna 113 is implemented with a length sufficient for covering and protecting the lens 111 and the absorber 112 in the antenna 110, a propagation path of the RADAR signal is relatively reduced when compared to the conventional radar level gauging apparatuses using a corrugated horn so that the radar level gauging apparatus may be miniaturized.

Alternatively, according to an additional aspect of the present invention, the antenna 110 may further include a waveguide 114, at least two lateral fixing rods 115, and an upper support 116.

The waveguide 114 guides the RADAR signal between the controller 120 and the Luneburg lens. The RADAR signal transmitted and received between the Luneburg lens and the RADAR signal transmission/reception processor 123 of the controller 120 is guided through the waveguide 114.

The at least two lateral fixing rods 115 laterally fix the Luneburg lens. For example, four lateral fixing rods 115 may be provided in front-rear and lateral directions to be implemented to firmly fix the Luneburg lens laterally, but the present invention is not limited thereto.

The upper support 116 supports the Luneburg lens in a direction from top to bottom. For example, the upper support 116 may have a structure including a first upper support 116a configured to support the Luneburg lens in an apex portion above the Luneburg lens, and a second upper support 116b installed between at least two lateral fixing rods 115 and the first upper support 116a and configured to partially support an upper spherical surface of the Luneburg lens.

In addition, when the radar level gauging apparatus is assembled upside down, the upper support 116 supports the Luneburg lens in a direction from bottom to top to serve to facilitate assembly of the lateral fixing rod 115.

With such implementation, in a state in which the Luneburg lens is fixed without movement due to the at least two lateral fixing rods 115 and upper support 116, the RADAR signal is guided between the Luneburg lens and the RADAR signal transmission/reception processor 123 of the controller 120 through the waveguide 114 so that it is possible to prevent degradation of a level measurement performance due to movement of the Luneburg lens.

Alternatively, according to an additional aspect of the present invention, the RADAR signal generator 121 may be implemented to generate a pulse signal having a frequency ranging from 5.925 GHz to 7.250 GHz or a FMCW signal.

In this case, in order to satisfy the FCC regulations, the antenna 110 may be implemented to emit a RADAR signal having a beam width of 3 dB at an emission angle of less than 12°.

Alternatively, in order to satisfy the FCC regulations, the antenna 110 may be implemented to emit a RADAR signal having a side lobe level of less than −22 dB at an emission angle of ±60° or more.

Alternatively, according to an additional aspect of the present invention, the RADAR signal generator 121 may be implemented to generate a pulse signal having a frequency ranging from 24.05 GHz to 29.00 GHz or a FMCW signal.

In this case, in order to satisfy the FCC regulations, the antenna 110 may be implemented to emit a RADAR signal having a beam width of 3 dB at an emission angle of less than 12°.

Alternatively, in order to satisfy the FCC regulations, the antenna 110 may be implemented to emit a RADAR signal having a side lobe level of less than −27 dB at an emission angle of ±60° or more.

As described above, it is possible to reduce a side lobe which is a factor that degrades level measurement precision and interferes with other devices so that the level measurement precision may be improved and the RADAR level gauging apparatus may be miniaturized, and thus convenience of a user may be improved.

In accordance with the present invention, there is an effect in that it is possible to reduce a side lobe, which is a factor that degrades level measurement precision and interferes with other devices so that the level measurement precision can be improved and the RADAR level gauging apparatus can be miniaturized, and thus convenience of a user can be improved.

The various embodiments disclosed in the present specification and the accompanying drawings are merely provided for specific examples so as to aid understanding and are not intended to limit the scope of the various embodiments of the present invention.

Accordingly, it should be construed that, in addition to the embodiments described herein, the scope of the various embodiments of the present invention falls in the scope of the various embodiments of the present invention, and all changes or modified forms derived on the basis of the technical spirit of the various embodiments of the present invention are included in the scope of the various embodiments of the present invention.

What is claimed is:

1. A radio detection and ranging (RADAR) level gauging apparatus comprising:
    an antenna configured to emit a RADAR signal to a level interface and receive the RADAR signal reflected from the level interface; and
    a controller configured to perform transmission control for the RADAR signal emitted by the antenna, reception control for the RADAR signal received by the antenna, and level measurement control using the received RADAR signal,
    wherein the antenna includes:
    a lens through which the RADAR signal is transmitted or received in a direction perpendicular to the level interface; and
    an absorber configured to reduce a side lobe of the RADAR signal transmitted or received through the lens, and
    wherein the lens includes a Luneburg lens.

2. The RADAR level gauging apparatus of claim 1, wherein the antenna is implemented to emit a RADAR signal having a beam width of 3 dB at an emission angle of less than 8°.

3. The RADAR level gauging apparatus of claim 1, wherein the antenna is implemented to emit a RADAR signal having a side lobe level of less than −38 dB at an emission angle of ±60° or more.

4. The RADAR level gauging apparatus of claim 1, wherein the antenna further includes:
    a waveguide configured to guide the RADAR signal between the controller and the Luneburg lens;
    at least two lateral fixing rods configured to laterally fix the Luneburg lens; and
    an upper support configured to support the Luneburg lens in a direction from top to bottom.

5. The RADAR level gauging apparatus of claim 1, wherein the controller includes:
    a RADAR signal generator configured to generate the RADAR signal for measuring a level;
    a trigger signal generator configured to generate a periodic trigger signal for whether to transmit or receive the RADAR signal;
    a RADAR signal transmission/reception processor configured to process and transmit, in response to the trigger signal generated by the trigger signal generator, the RADAR signal generated by the RADAR signal generator to periodically emit the RADAR signal to the level interface through the antenna or configured to receive and process the RADAR signal reflected from the level interface and periodically received through the antenna; and
    a level measurement part configured to periodically measure the level using the RADAR signal which is periodically received and processed by the RADAR signal transmission/reception processor and reflected from the level interface.

6. A radio detection and ranging (RADAR) level gauging apparatus comprising:
    an antenna configured to emit a RADAR signal to a level interface and receive the RADAR signal reflected from the level interface; and
    a controller configured to perform transmission control for the RADAR signal emitted by the antenna, reception control for the RADAR signal received by the antenna, and level measurement control using the received RADAR signal,
    wherein the antenna includes:
    a lens through which the RADAR signal is transmitted or received in a direction perpendicular to the level interface; and
    an absorber configured to reduce a side lobe of the RADAR signal transmitted or received through the lens,
    wherein the antenna further includes a cylindrical body to constitute an exterior of the antenna and surround internal components of the antenna to protect the internal components.

7. The RADAR level gauging apparatus of claim 6, wherein the cylindrical body functions as a waveguide, and serves to reduce a side lobe.

* * * * *